US008392070B2

(12) United States Patent
Foo et al.

(10) Patent No.: US 8,392,070 B2
(45) Date of Patent: *Mar. 5, 2013

(54) METHOD AND APPARATUS FOR CONTROLLING AN ACTUATABLE SAFETY DEVICE

(75) Inventors: Chek-Peng Foo, Ann Arbor, MI (US); Tongtong Wang Couture, Livonia, MI (US); Quanbo Xu, Shanghai (CN); Wei Liu, Shanghai (CN); Xiaoliang Cheng, Shanghai (CN); Hongmei Wang, Shanghai (CN); Yueyi Huang, Shanghai (CN); Yan Wang, Shanghai (CN)

(73) Assignee: TRW Automotive U.S. LLC, Livonia, MI (US)

( * ) Notice: Subject to any disclaimer, the term of this patent is extended or adjusted under 35 U.S.C. 154(b) by 873 days.

This patent is subject to a terminal disclaimer.

(21) Appl. No.: 12/200,490

(22) Filed: Aug. 28, 2008

(65) Prior Publication Data
US 2010/0057287 A1 Mar. 4, 2010

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. ....................................................... 701/45

(58) Field of Classification Search .................. 701/45, 701/29, 26; 280/734, 735; 180/282
See application file for complete search history.

(56) References Cited

U.S. PATENT DOCUMENTS

| 5,746,444 | A | 5/1998 | Foo et al. |
| 5,749,059 | A | 5/1998 | Walton |
| 5,935,182 | A * | 8/1999 | Foo et al. .................. 701/45 |
| 6,036,225 | A | 3/2000 | Foo et al. |
| 6,459,366 | B1 * | 10/2002 | Foo et al. ................ 340/436 |
| 6,529,810 | B2 * | 3/2003 | Foo et al. .................. 701/45 |
| 6,776,435 | B2 * | 8/2004 | Foo et al. ................ 280/735 |
| 7,359,781 | B2 * | 4/2008 | Foo et al. .................. 701/45 |

(Continued)

FOREIGN PATENT DOCUMENTS
CN 1809482 A 7/2006

OTHER PUBLICATIONS

Ashton de Silva, et. al; The vector innovation structural time series framework: a simple approach to multivariate forecasting; May 10, 2007.*

(Continued)

*Primary Examiner* — Janet M Wilkens
*Assistant Examiner* — Andrew Roersma
(74) *Attorney, Agent, or Firm* — Tarolli, Sundheim, Covell & Tummino LLP

(57) ABSTRACT

A method for determining a crash condition of a vehicle comprises the step of sensing crash acceleration in a first direction substantially parallel to a front-to-rear axis of the vehicle and providing a first acceleration signal indicative thereof. The method also comprises the step of sensing crash acceleration in a second direction substantially parallel to a side-to-side axis of the vehicle and near opposite sides of the vehicle and providing second acceleration signals indicative thereof. The method further comprises the steps of determining a transverse crash value functionally related to the second acceleration signals and comparing the determined transverse crash value against a safing threshold. The method still further comprises the step of determining a crash condition of the vehicle in response to (a) the comparison and (b) the first acceleration signal.

12 Claims, 5 Drawing Sheets

U.S. PATENT DOCUMENTS

| | | | | |
|---|---|---|---|---|
| 7,625,006 B2 * | 12/2009 | Foo et al. | | 280/735 |
| 7,744,123 B2 * | 6/2010 | Foo et al. | | 280/735 |
| 7,840,325 B2 * | 11/2010 | Foo et al. | | 701/45 |
| 2003/0074111 A1 * | 4/2003 | Ugusa et al. | | 701/1 |
| 2006/0129295 A1 * | 6/2006 | Foo et al. | | 701/45 |
| 2006/0184300 A1 * | 8/2006 | Schubert et al. | | 701/45 |
| 2006/0254848 A1 * | 11/2006 | Foo et al. | | 180/274 |
| 2007/0005207 A1 | 1/2007 | Foo et al. | | |
| 2008/0204209 A1 | 8/2008 | Theisen | | |
| 2010/0057302 A1 * | 3/2010 | Foo et al. | | 701/45 |

OTHER PUBLICATIONS

Andrew M. Novakovic; Dairy Price Analysis and Forecasting: Autoregressive Moving Average or ARMA Process; Apr. 24, 2008.*

The International Search Report dated Mar. 29, 2010 for PCT International Application No. PCT/US2009/055107, filed Aug. 27, 2009, 10 pages.

* cited by examiner

METHOD AND APPARATUS FOR CONTROLLING AN ACTUATABLE SAFETY DEVICE

FIELD OF THE INVENTION

The present invention relates to a method and apparatus for determining a vehicle crash condition and, in particular, to a method and apparatus for controlling an actuatable vehicle safety device in response to determining the occurrence of a vehicle crash condition.

BACKGROUND OF THE INVENTION

Actuatable occupant restraint systems are used to help protect occupants of a vehicle in a vehicle crash event. Such actuatable occupant restraint systems may include an inflatable occupant restraint device, such as an air bag, to help protect a vehicle occupant upon the determined occurrence of a vehicle crash event.

U.S. Pat. No. 5,935,182 to Foo et al., assigned to TRW Inc., discloses a method and apparatus for determining such crash events and is particularly directed to discriminating a vehicle crash condition using virtual crash sensing. U.S. Pat. No. 6,036,225 to Foo et al., assigned to TRW Inc., discloses a method and apparatus for controlling a multistage actuatable restraining system in a vehicle using crash severity index values. U.S. Pat. No. 6,186,539 to Foo et al., also assigned to TRW Inc., discloses a method and apparatus for controlling a multistage actuatable restraining device using crash severity indexing and crush zone sensors. U.S. Patent Application Publication No. 2007/0005207 to Foo et al., assigned to TRW Automotive U.S. LLC, discloses a method and apparatus for controlling an actuatable restraining device using side satellite accelerometers.

SUMMARY OF THE INVENTION

The present invention is directed to a method and apparatus for determining a vehicle crash condition and, in particular, to a method and apparatus for controlling an actuatable vehicle safety device in response to determining the occurrence of a vehicle crash condition.

In accordance with an example embodiment of the present invention, a method for determining a crash condition of a vehicle comprises the step of sensing crash acceleration in a first direction substantially parallel to a front-to-rear axis of the vehicle and providing a first acceleration signal indicative thereof. The method also comprises the step of sensing crash acceleration in a second direction substantially parallel to a side-to-side axis of the vehicle and near opposite sides of the vehicle and providing second acceleration signals indicative thereof. The method further comprises the steps of determining a transverse crash value functionally related to the second acceleration signals and comparing the determined transverse crash value against a safing threshold. The method still further comprises the step of determining a crash condition of the vehicle in response to (a) the comparison and (b) the first acceleration signal.

In accordance with another example embodiment of the present invention, an apparatus for determining a crash condition of a vehicle comprises a first accelerometer for sensing crash acceleration in a first direction substantially parallel to a front-to-rear axis of the vehicle and providing a first acceleration signal indicative thereof. The apparatus also comprises second accelerometers for sensing crash acceleration in a second direction substantially parallel to a side-to-side axis of the vehicle and near opposite sides of the vehicle and providing second acceleration signals indicative thereof. The apparatus further comprises a controller for determining a transverse crash value functionally related to the second acceleration signals and comparing the transverse crash value against a safing threshold. The controller also determines a crash condition of the vehicle in response to (a) the comparison and (b) the first acceleration signal.

BRIEF DESCRIPTION OF THE DRAWINGS

The foregoing and other features and advantages of the present invention will become apparent to one skilled in the art upon consideration of the following description of the invention and the accompanying drawings, in which.

DETAILED DESCRIPTION

Figure 1:
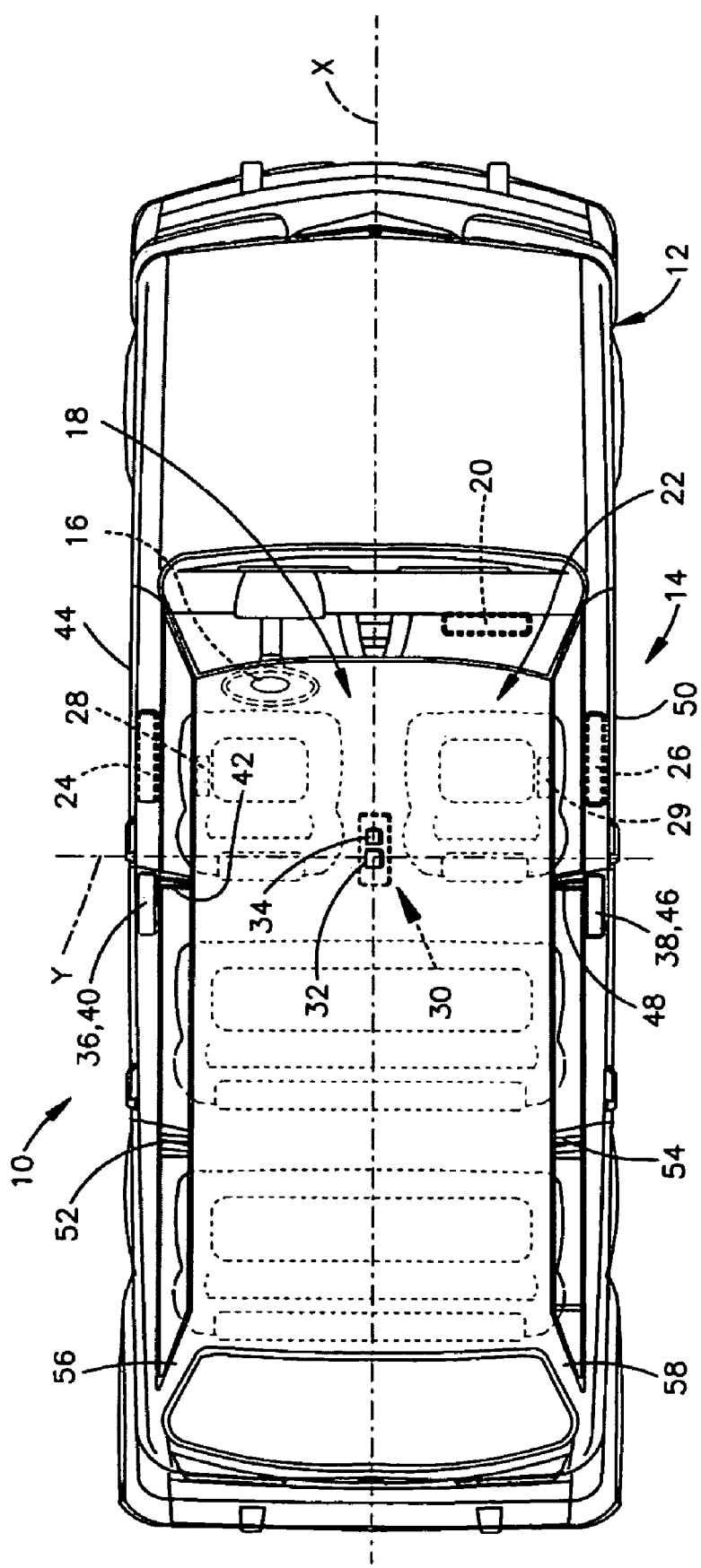
FIG. 1 is a schematic top view of a vehicle having an actuatable occupant restraint system in accordance with an example embodiment of the present invention.
Figure 2:
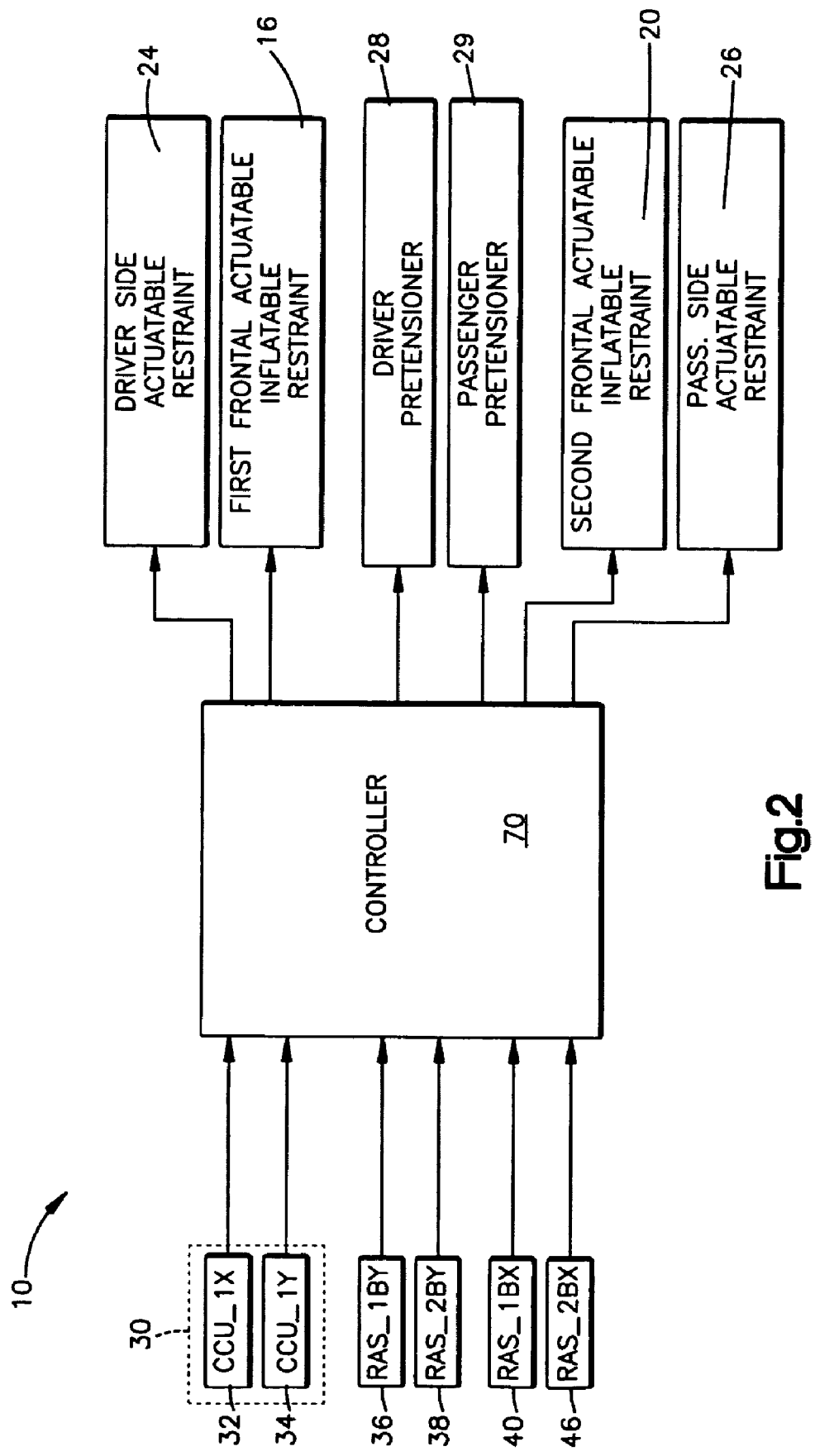
FIG. 2 is a functional block diagram of the control portion of the apparatus of FIG. 1.

Referring to FIGS. 1 and 2, an apparatus 10 is mounted in a vehicle 12 for determining a crash condition of the vehicle and controlling actuation of an actuatable occupant restraint system 14, in accordance with an example of the present invention. The actuatable occupant restraint system 14 comprises, for example, a first frontal inflatable occupant restraint device 16, such as a steering wheel-mounted air bag module, located on a driver side 18 of the vehicle 12. The actuatable occupant restraint system 14 may also comprise a second frontal inflatable occupant restraint device 20, such as an instrument panel-mounted air bag module, located on a passenger side 22 of the vehicle 12.

The actuatable occupant restraint system 14 may further comprise a first side impact inflatable occupant restraint device 24, such as a door-mounted air bag module, a seat-mounted air bag module, or a roof rail-mounted curtain air bag module, located on the driver side 18 of the vehicle 12. The first side impact inflatable occupant restraint device 24 may alternatively be located anywhere in or adjacent to side structure of the vehicle 12, such as the side pillars and/or side body panels. The actuatable occupant restraint system 14 may still further comprise a second side impact inflatable occupant restraint device 26, such as a door-mounted air bag module, a seat-mounted air bag module, or a roof rail-mounted curtain air bag module, located in or adjacent to side structure on the passenger side 22 of the vehicle 12. The actuatable occupant restraint system 14 may yet further or alternatively comprise an actuatable seat belt occupant restraint device, such as a driver side seat belt pretensioner 28 and/or a passenger side seat belt pretensioner 29. The actuatable occupant restraint system 14 may additionally or alternatively comprise any actuatable occupant restraint device that helps to protect a vehicle occupant in response to an impact to the vehicle 12.

The occupant restraint devices 16, 20, 24, 26, 28 and 29 of the actuatable occupant restraint system 14 are actuatable restraint or safety devices of the vehicle 12. Other actuatable restraint or safety devices of the vehicle 12 that may be actuated in response to an impact to or a crash condition of the vehicle include vehicle door locks (not shown) and may include a suspension control system (not shown), a deployable roll bar (not shown), and an external air bag (not shown) or other inflatable devices internal or external to the vehicle.

The apparatus 10 further comprises a collision or crash sensor assembly 30 located at a substantially central location in the vehicle 12. The sensor assembly 30 includes a first crash acceleration sensor 32, such as an accelerometer, having its axis of sensitivity oriented to sense crash acceleration in a direction substantially parallel to a longitudinal or front-to-rear axis of the vehicle 12. The longitudinal or front-to-rear axis of the vehicle 12 is designated the X-axis in FIG. 1. The first crash acceleration sensor 32 provides a crash acceleration signal designated CCU_1X. The sensor assembly 30 also comprises a second crash acceleration sensor 34, such as an accelerometer, having its axis of sensitivity oriented to sense crash acceleration in a direction substantially parallel to a transverse or side-to-side axis of the vehicle 12. The transverse or side-to-side axis of the vehicle 12 is designated the Y-axis in FIG. 1 and is oriented substantially perpendicular to the X-axis. The second crash acceleration sensor 34 provides a crash acceleration signal designated CCU_1Y.

The first crash acceleration sensor 32, in accordance with one example embodiment of the present invention, has a nominal sensitivity of ±100 g's (g being the value of acceleration due to earth's gravity, i.e., 32 feet per second squared or 9.8 meters per second squared). The second crash acceleration sensor 34, in accordance with one example embodiment of the present invention, has a nominal sensitivity of ±20 g's.

The crash acceleration signals CCU_1X and CCU_1Y from the crash acceleration sensors 32 and 34, respectively, can take any of several forms. Each of the crash acceleration signals CCU_1X and CCU_1Y can have amplitude, frequency, pulse duration, and/or any other electrical characteristic that varies as a function of the sensed crash acceleration. In the example embodiment shown in FIGS. 1 and 2, the crash acceleration signals CCU_1X and CCU_1Y have frequency and amplitude characteristics indicative of the sensed crash acceleration, i.e., that vary as a function of the sensed crash acceleration. Thus, each of the crash acceleration signals CCU_1X and CCU_1Y has an electrical characteristic functionally related to the sensed crash acceleration along the axis of sensitivity of the corresponding crash acceleration sensor 32 or 34, respectively.

The apparatus 10 may also include two driver side satellite crash acceleration sensors 36 and 40 located in or adjacent or near to a side structure on the driver side 18 of the vehicle 12, such as in the driver side vehicle B-pillar 42 or in the driver side door 44. The side satellite crash acceleration sensor 36 has an axis of sensitivity oriented to sense crash acceleration in a direction substantially parallel to the vehicle's Y-axis and provides a signal designated RAS_1BY. The side satellite crash acceleration sensor 40 has an axis of sensitivity oriented to sense crash acceleration in a direction substantially parallel to the vehicle's X-axis and provides a signal designated RAS_1BX. Although the side satellite crash acceleration sensors 36 and 40 are described as being separate sensors, they may be combined in a single XY sensor.

The apparatus 10 may further include two passenger side satellite crash acceleration sensors 38 and 46 located in or adjacent or near to a side structure on the passenger side 22 of the vehicle 12, such as in the passenger side B-pillar 48 or in the passenger side door 50. The side satellite crash acceleration sensor 38 has an axis of sensitivity oriented to sense crash acceleration in a direction substantially parallel to the vehicle's Y-axis and provides a signal designated as RAS_2BY. The side satellite crash acceleration sensor 46 has an axis of sensitivity oriented to sense crash acceleration in a direction substantially parallel to the vehicle's X-axis and provides a signal designated as RAS_2BX. Although the side satellite crash acceleration sensors 38 and 46 are described as being separate sensors, they may be combined in a single XY sensor.

The crash acceleration signals RAS_1BY, RAS_1BX, RAS_2BY, and RAS_2BX from the side satellite crash acceleration sensors 36, 40, 38 and 46, respectively, can take any of several forms. Each of the crash acceleration signals RAS_1BY, RAS_1BX, RAS_2BY, and RAS_2BX can have amplitude, frequency, pulse duration, and/or any other electrical characteristic that varies as a function of the sensed crash acceleration. In the embodiment of FIGS. 1 and 2, the crash acceleration signals RAS_1BY and RAS_2BY have frequency and amplitude characteristics that vary as a function of the sensed crash acceleration in a direction substantially parallel to the vehicle's Y-axis. The crash acceleration signals RAS_1BX and RAS_2BX have frequency and amplitude characteristics that vary as a function of the sensed crash acceleration in a direction substantially parallel to the vehicle's X-axis. Thus, each of the crash acceleration signals RAS_1BY, RAS_1BX, RAS_2BY, and RAS_2BX has an electrical characteristic that varies as a function of the sensed crash acceleration along the axis of sensitivity of the corresponding side satellite crash acceleration sensor 36, 40, 38 or 46, respectively. Side satellite crash acceleration sensors 36 and 38 are arranged to sense acceleration and provide positive crash acceleration values in opposite directions.

The apparatus 10 may include other Y-axis and X-axis side satellite crash acceleration sensors. Such other Y-axis and X-axis side satellite crash acceleration sensors may be mounted in or adjacent to C-pillars 52 and 54 on the driver side 18 and passenger side 22, respectively, of the vehicle 12 and/or in or adjacent to D-pillars 56 and 58 on the driver side 18 and passenger side 22, respectively, of the vehicle. If C-pillar and/or D-pillar side satellite crash acceleration sensors are used, their signals would be designated as RAS_C3Y and RAS_C3X (driver side C-pillar 52), RAS_C4Y and RAS_C4X (passenger side C-pillar 54), RAS_D5Y and RAS_D5X (driver-side D-pillar 56), and RAS_D6Y and RAS_D6X (passenger side D-pillar 58), respectively. In the embodiment of the invention shown in FIGS. 1 and 2, however, only side satellite crash acceleration sensors 36, 40, 38 and 46 are present.

Referring to FIG. 2, the apparatus 10 further includes a controller 70. The crash acceleration signals CCU_1X and CCU_1Y from the crash acceleration sensors 32 and 34, respectively, and the crash acceleration signals RAS_1BY and RAS_2BY from side satellite crash acceleration sensors 36 and 38, respectively, are provided to the controller 70. In accordance with one example embodiment of the present invention, the controller 70 may be a microcomputer programmed to execute a control process, including one or more algorithms. The functions performed by the controller 70 could, however, be carried out by other digital and/or analog circuitry, including separate electrical or electronic components, which could be assembled on one or more circuit boards using discrete circuitry or fabricated as an application specific integrated circuit ("ASIC").

In accordance with an example embodiment of the present invention, the controller 70 monitors the crash acceleration signals CCU_1X and CCU_1Y from the crash acceleration sensors 32 and 34, respectively, and the crash acceleration signals RAS_1BY and RAS_2BY from side satellite crash acceleration sensors 36 and 38, respectively. The controller 70 performs one or more crash determination algorithms to determine whether a vehicle crash condition exists. If the controller 70 determines that a vehicle crash event is occurring for which actuation or deployment of the actuatable occupant restraint system 14 or individual occupant restraint devices or other actuatable safety devices of the vehicle is desired, the devices will be actuated. The controller 70 has the ability to discriminate between a deployment crash event and a non-deployment crash event.

The crash determination algorithms performed by the controller 70 determine certain values from the crash acceleration signals CCU_1X, CCU_1Y, RAS_1BY, and RAS_2BY. The determined values are used in determining whether a vehicle crash condition exists and whether the actuatable occupant restraint system 14 or individual occupant restraint devices or any other actuatable safety device of the vehicle should be deployed or actuated. If a determination is made, in accordance with the determined values, to deploy or actuate the actuatable occupant restraint system 14 or individual occupant restraint devices, such as the first frontal inflatable occupant restraint device 16 or the second frontal inflatable restraint device 20, or any other actuatable safety device of the vehicle, the controller 70 outputs an appropriate deployment signal or command. Multi-stage devices may be actuated at different times depending on the determined values and the time of threshold crossings or different devices may be actuated at different times depending on the determined values and the times of threshold crossings.

The apparatus 10, in accordance with one example embodiment of the invention, uses only the crash acceleration signals CCU_1X, CCU_1Y, RAS_1BY and RAS_2BY in determining whether a vehicle crash condition exists and whether the actuatable occupant restraint system 14 or individual actuatable occupant restraint or safety devices of the vehicle should be deployed or actuated. The apparatus 10 may alternatively also employ the additional crash acceleration signals RAS_1BX and RAS_2BX from additional side satellite crash acceleration sensors 40 and 46, with or without filtering, in crash determination and/or deployment or actuation decisions. Other signals that may be received and employed in crash determination and/or deployment or actuation decisions, in addition to the crash acceleration signals CCU_1X, CCU_1Y, RAS_1BY, and RAS_2BY, are signals RAS_C3Y, RAS_C3X, RAS_C4Y, RAS_C4X, RAS_D5Y, RAS_D5X, RAS_D6Y, and RAS_D6X from optional C-pillar and/or D-pillar side satellite crash acceleration sensors if so desired to aid in detecting a specific type of collision event. Still other signals that may be received and employed in crash determination and/or deployment or actuation decisions are signals from a driver and/or passenger seat belt buckle switch sensor that provides a signal indicating whether the buckle is latched or unlatched, a driver and/or passenger weight sensor that provides a signal indicative of the seat occupant's sensed weight, and sensors that provide signals indicative of other vehicle occupant information, such as presence, position, height, girth, movement, and/or use of a child seat.

Figure 3:
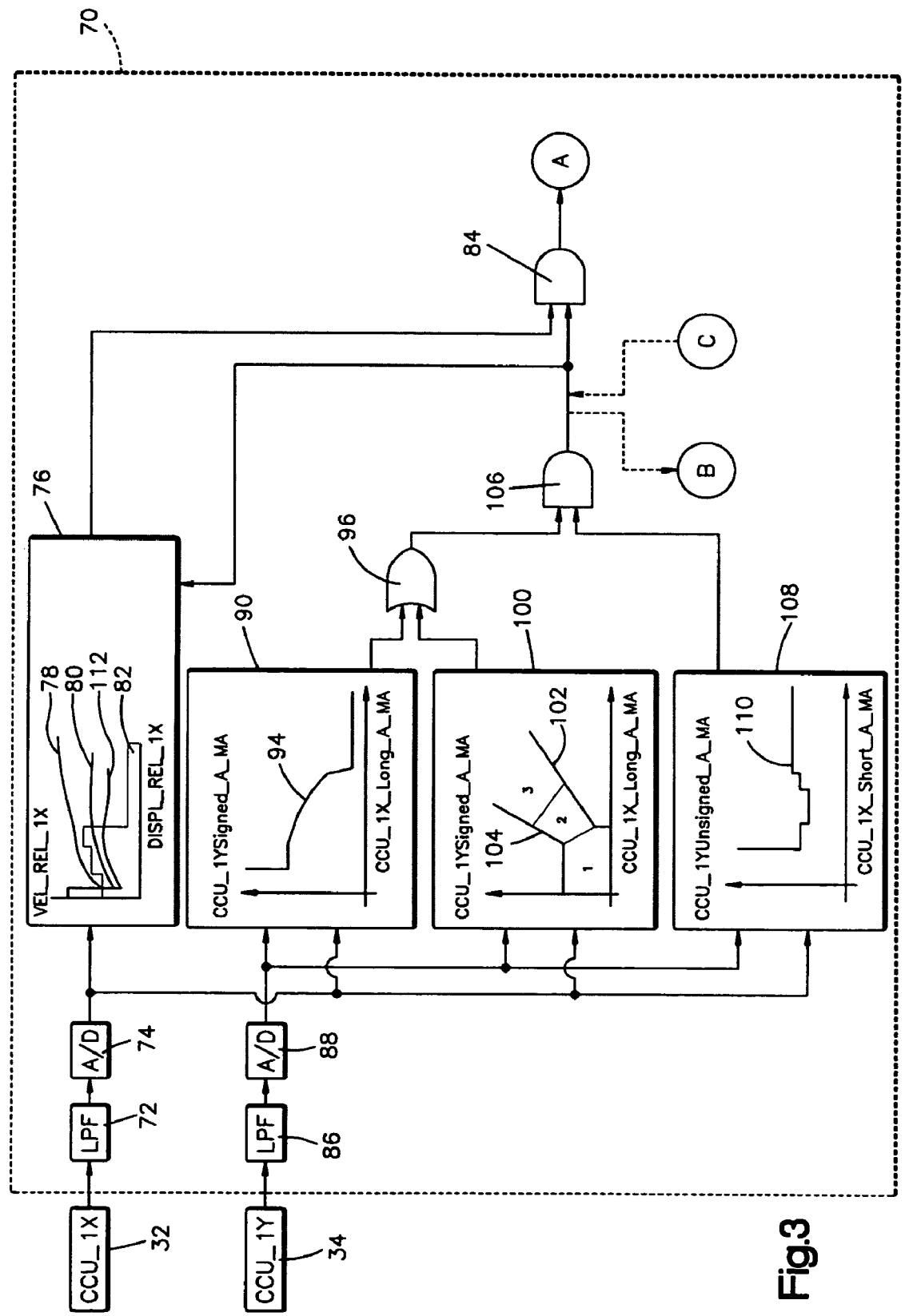
FIG. 3 is a functional block diagram showing a first part of a control process used by the control portion of FIG. 2 in accordance with one example embodiment of the present invention.
Figure 4:
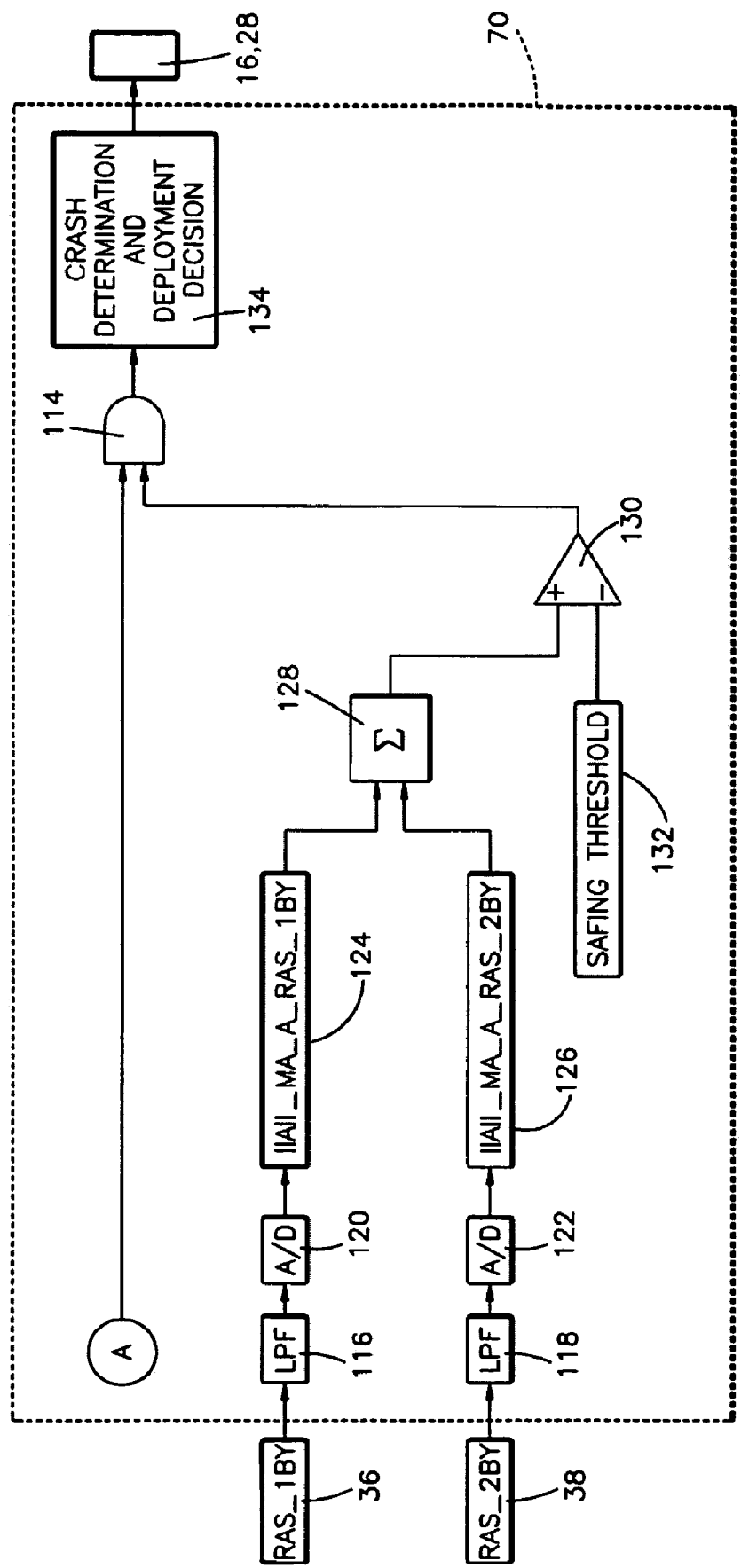
FIG. 4 is a functional block diagram showing a second part of the control process shown in FIG. 3.

Referring to FIGS. 3 and 4, the controller 70 determines whether a deployment vehicle crash condition exists and controls the actuatable occupant restraint system 14 using a control process and logic shown in accordance with one example embodiment of the present invention. The process and logic shown and described in FIGS. 3 and 4 is specifically directed to controlling an actuatable occupant restraint device on the driver side 18 of the vehicle 12, such as the first frontal inflatable occupant restraint device 16. Nonetheless, this process and logic is representative of the process and logic that may be used to control any actuatable restraint of the vehicle 12, such as the second frontal inflatable occupant restraint device 20 on the passenger side 22 of the vehicle 12 or any other actuatable occupant restraint device that helps to protect a vehicle occupant in response to a crash condition of the vehicle 12. The control process and logic may also be used to control any actuatable safety device of the vehicle 12, such as vehicle door locks, a suspension control system, a deployable roll bar and/or an external air bag or other inflatable device external or internal to the vehicle.

In accordance with the example embodiment control process of FIGS. 3 and 4, the crash acceleration sensor 32 provides an acceleration signal CCU_1X having a characteristic (e.g., frequency and amplitude) indicative of the vehicle's acceleration in a direction substantially parallel to the X-axis of the vehicle 12. The acceleration signal CCU_1X is provided to a low-pass-filter ("LPF") function 72 of the controller 70. The LPF function 72 filters the acceleration signal CCU_1X to eliminate extraneous signal components, such as frequencies resulting from extraneous vehicle operating events and/or from road noise. The signal components removed through filtering are not useful in discriminating whether a vehicle crash event is occurring and whether a vehicle crash event is occurring for which deployment of a driver side actuatable occupant restraint device, such as the first frontal inflatable occupant restraint device 16, is desired. Empirical testing or calculation may be used to determine the signal components useful for discrimination of a vehicle crash condition in a vehicle of interest and/or determining whether a vehicle crash event is occurring for which deployment of a driver side actuatable occupant restraint device is desired. Signal components indicative of a vehicle crash condition and/or useful in determining whether a vehicle crash event is occurring for which deployment of a driver side actuatable occupant restraint device is desired are output for further processing.

The filtered output signal from the LPF function 72 is provided to an analog-to-digital ("A/D") converter function 74 of the controller 70. The A/D converter function 74 converts the filtered crash acceleration signal into a digital signal. The output of the A/D converter function 74 may be filtered with another filter function (not shown) having filter values determined for the purpose of eliminating small drifts and offsets associated with the A/D conversion. This other filter function may be digitally implemented within the controller 70. A determination and comparison function 76 of the controller 70 determines two crash metric values, VEL_REL_1X and DISPL_REL_1X, from the filtered crash acceleration signal CCU_1X. Specifically, the determination and comparison function 76 determines VEL_REL_1X, which is velocity in a direction substantially parallel to the X-axis, by integrating the filtered crash acceleration signal CCU_1X. The determination and comparison function 76 also determines DISP_REL_1X, which is displacement in a direction substantially parallel to the X-axis, by double integrating the filtered crash acceleration signal CCU_1X.

The crash displacement value and crash velocity value are preferably determined using a virtual crash sensing process fully described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

The determination and comparison function 76 of the controller 70 compares the value VEL_REL_1X against at least one discrimination threshold, which comparison is used to discriminate whether a crash event is occurring. The discrimination threshold may be variable or may be fixed. In accordance with one example embodiment of the invention, the determination and comparison function 76 compares the VEL_REL_1X value as a function of the DISPL_REL_1X value against a first varying discrimination, threshold 78 and a second varying discrimination threshold 80. Graphical representations of the variations of the first and second thresholds 78 and 80, in accordance with one example embodiment of the invention, are included in FIG. 3. As can be seen, after an initial high plateau followed by a large step or drop, the first and second thresholds 78 and 80 generally increase with increasing displacement DISPL_REL_1X in a direction substantially parallel to the X-axis. Empirical testing or calculation may be used to determine the variation in the first and second thresholds 78 and 80 as a function of the displacement value DISPL_REL_1X needed to provide the desired actuation control. The occurrence of the VEL_REL_1X value exceeding the first threshold 78 or the second threshold 80, as determined by determination and comparison function 76, is time latched by a latch function (not shown) of controller 70, which provides a digital HIGH signal to an AND function 114 (FIG. 4) of the controller 70 for a predetermined time period. This portion of the example embodiment control process is not shown in FIGS. 3 and 4, which instead illustrate the control process if the VEL_REL_1X value does not exceed either the first threshold 78 or the second threshold 80, as determined by determination and comparison function 76.

As part of comparing the VEL_REL_1X value as a function of the DISPL_REL_1X value against first and second varying thresholds 78 and 80, the determination and comparison function 76 ensures that the VEL_REL_1X value lies outside of a safing immunity box 82 before initiating any comparison. The purpose of the safing immunity box 82 is to filter misuse events and to prevent actuation of the occupant restraint devices when crash velocity and/or crash displacement values are within the safing immunity box values. Misuse events include hammer blows, road bumps, door slams, and other events, which produce output signals from the crash acceleration sensor 32 that are not the result of deployment crash events. The safing immunity box 82 is represented by values of determined crash velocity and crash displacement below which the actuatable occupant restraint system 14 cannot be actuated. It is only after the determined crash velocity VEL_REL_1X values and/or crash displacement DISPL_REL_1X values exceed the velocities and displacements represented by the safing immunity box 82 and are, therefore, outside of the safing immunity box 82 that actuation of the actuatable occupant restraint system 14 is normally permitted in response to crash metric determinations. Accordingly, the term "immunity" may, at times, be used herein when discussing threshold, values that define whether or not an actuation of the actuatable occupant restraint system 14 is permitted.

The safing immunity box 82 defines an area bounded by predetermined upper limit values of VEL_REL_1X and DISPL_REL_1X. When the determined value of VEL_REL_1X is within the area of the safing immunity box 82, the safing function is OFF or at a digital LOW condition and, therefore, actuation of the actuatable occupant restraint system 14 cannot occur. If the value VEL_REL_1X is outside of the safing immunity box 82, the safing function is ON or at a digital HIGH condition and, therefore, the actuatable occupant restraint system 14 can be actuated. In accordance with the present invention, if the value VEL_REL_1X is outside the safing immunity box 82 and then enters or re-enters the safing immunity box, t the time period that the safing function is or remains ON is extended or enhanced after the value of VEL_REL_1X enters or reenters the safing immunity box. This is referred to as a latched time period. Also, even though only one safing immunity box 82 is shown in FIG. 3, each threshold 78 and 80 may have an associated safing immunity box.

Although FIG. 3 shows a single output from determination and comparison function 76, there are actually two outputs. A first output reflects the occurrence of the VEL_REL_1X value exceeding the first threshold 78. A second output reflects the occurrence of the VEL_REL_1X value exceeding the second threshold 80. The controller 70 distinguishes between the first and second outputs throughout the remaining steps of the control process. The first output is used to control the actuation of one vehicle occupant restraint device or other vehicle safety device, such as the first frontal inflatable occupant restraint device 16. The second output is used to control the actuation of another vehicle occupant restraint device or other vehicle safety device, such as a driver side seat belt pretensioner 28. If only a single threshold is desired for all actuatable occupant restraint devices or other vehicle safety devices, only one of the thresholds 78 and 80 may be employed in the control process of FIGS. 3 and 4. Similarly, if more than two thresholds are desired to control more than two different occupant restraint devices or other safety devices in accordance with different thresholds, additional thresholds may be employed in the control process of FIGS. 3 and 4.

Also in accordance with the example embodiment control process of FIGS. 3 and 4, the crash acceleration sensor 34 provides an acceleration signal CCU_1Y having a characteristic (e.g., frequency and amplitude) indicative of the vehicle's crash acceleration in a direction substantially parallel to the Y-axis of the vehicle 12 upon the occurrence of a crash event. The acceleration signal CCU_1Y is provided to an LPF function 86 of the controller 70. The LPF function 86 filters the acceleration signal CCU_1Y to eliminate extraneous signal components, such as frequencies resulting from extraneous vehicle operating events and/or from road noise. The signal components removed through filtering are not useful in discriminating whether a vehicle crash condition exists and whether a vehicle crash event is occurring for which deployment of a driver side actuatable occupant restraint device, such as the first frontal inflatable occupant restraint device 16, is desired. Empirical testing or calculation may be used to determine the signal components useful for discrimination of a vehicle crash condition in a vehicle of interest and/or determining whether a vehicle crash event is occurring for which deployment of a driver side actuatable occupant restraint device is desired. Signal components indicative of a vehicle crash condition and/or useful in determining whether a vehicle crash event is occurring for which deployment of a driver side actuatable occupant restraint device is desired are output for further processing.

The filtered output signal from the LPF function 86 is provided to an A/D converter function 88 of the controller 70. The AND converter function 88 converts the filtered crash acceleration signal CCU_1Y into a digital signal. The output of the A/D converter function 88 may be filtered with another filter function (not shown) having filter values determined for the purpose of eliminating small drifts and offsets associated with the A/D conversion. This other filter function may be digitally implemented within the controller 70. The filtered crash acceleration signal CCU_1Y is provided to a determination and comparison function 90 of the controller 70, which determines a crash metric value CCU_1YSigned_A_MA from the filtered crash acceleration signal CCU_1Y and also determines a crash metric value CCU_1X_Long_A_MA from the filtered crash acceleration signal CCU_1X.

The value CCU_1YSigned_A_MA is a moving average of acceleration as sensed by the second crash acceleration sensor 34. This value is determined by calculating moving average-values of the associated filtered acceleration signal CCU_1Y from the second crash acceleration sensor 34. A moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average." Empirical testing or calculation may be used to determine the number of samples to be used for the value CCU_1YSigned_A_MA. The moving average values of the associated filtered acceleration signal CCU_1Y from the second crash acceleration sensor 34 are computed using "signed" values of the acceleration signal. Specifically, the direction of acceleration sensed by the second crash acceleration sensor 34 is reflected by providing a sign, i.e., plus or minus, for each value of the acceleration signal CCU_1Y. Those signs are considered in determining the crash metric value CCU_1YSigned_A_MA.

The value CCU_1X_Long_A_MA is a moving average of acceleration as sensed by the first crash acceleration sensor 32. This value is determined by calculating moving average values of the associated filtered acceleration signal CCU_1X from the first crash acceleration sensor 32. As previously explained, a moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average." Empirical testing or calculation may be used to determine the number of samples to be used for the value CCU_1X_Long_A_MA.

The determination and comparison function 90 of the controller 70 compares the value CCU_1YSigned_A_MA against a threshold. The threshold may be variable or may be fixed. Specifically, the determination and comparison function 90 compares the CCU_1YSigned_A_MA value as a function of the CCU_1X_Long_A_MA value against a varying threshold 94. A graphical representation of the variation of the threshold 94, in accordance with one example embodiment of the invention, is included in FIG. 3. As can be seen, after an initial high plateau followed by a large step or drop, the threshold 94 generally decreases with increasing CCU_1X_Long_A_MA values and ultimately becomes constant. Empirical testing or calculation may be used to determine the variation in the threshold 94 as a function of the CCU_1X_Long_A_MA value to produce the desired control effect for deployment of the occupant restraint device(s). The occurrence of the CCU_1YSigned_A_MA value exceeding the third threshold 94, as determined by determination and comparison function 90, is time latched by a latch function (not shown) of controller 70, which provides a digital HIGH signal to an OR function 96 of the controller for a predetermined time period.

The filtered crash acceleration signals CCU_1Y and CCU_1X from the A/D converter functions 88 and 74, respectively, are also provided to another determination and comparison function 100 of the controller 70. The determination and comparison function 100 determines the crash metric value CCU_1YSigned_A_MA from the filtered crash acceleration signal CCU_1Y and determines the crash metric value CCU_1X_Long_A_MA from the filtered crash acceleration signal CCU_1X. Alternatively, the crash metric values CCU_1YSigned_A_MA and CCU_1X_Long_A_MA may be provided to the determination and comparison function 100 by the determination and comparison function 90.

The determination and comparison function 100 compares the value CCU_1YSigned_A_MA against different thresholds. The different thresholds may be variable or may be fixed. Specifically, the determination and comparison function 100 compares the CCU_1YSigned_A_MA value as a function of the CCU_1X_Long_A_MA value-against a varying threshold 102 and a varying threshold 104. Graphical representations of the variations of the thresholds 102 and 104, in accordance with one example embodiment of the invention, are depicted in FIG. 3. As can be seen, the thresholds 102 and 104 generally increase with increasing CCU_1X_Long_A_MA values. Empirical testing or calculation may be used to determine the variations in the thresholds 102 and 104 as a function of the CCU_1X_Long_A_MA value to achieve a desired control function for deployment of the occupant restraint device(s).

If the CCU_1YSigned_A_MA value remains less than the threshold 104 and greater than the threshold 102 and also moves progressively through three zones (marked 1, 2 and 3 in FIG. 3) delineated between the thresholds 102 and 104, as determined by determination and comparison function 100, this occurrence is time latched by a latch function (not shown) of controller 70. This provides a digital HIGH signal to OR function 96 of the controller for a predetermined time period. When OR function 96 receives a digital HIGH either from the determination and comparison function 90 or from the determination and comparison function 100, via their respective time latch functions, the OR function is ON or HIGH and provides a digital HIGH signal to one input of an AND function 106.

The filtered crash acceleration signals CCU_1Y and CCU_1X from the A/D converter functions 88 and 74, respectively, are provided to a further determination and comparison function 108 of the controller 70. The determination and comparison function 108 determines a crash metric value CCU_1YUnsigned_A_MA from the filtered crash acceleration signal CCU_1Y and determines a crash metric value CCU_1X_Short_A_MA from the filtered crash acceleration signal CCU_1x.

The crash metric value CCU_1YUnsigned_A_MA is determined in the same manner as the value CCU_1YSigned_A_MA, except that the direction of acceleration sensed by the second crash acceleration sensor 34 is ignored for each value of the acceleration signal CCU_1Y. Thus, unsigned values of the acceleration signal CCU_1Y (i.e., their absolute values) are used in determining the crash metric value CCU_1YUnsigned_A_MA. Similarly, the crash metric value CCU_1X_Short_A_MA is determined in the same manner as the crash metric value CCU_1X_Long_A_MA, except that the predetermined number of samples of the filtered acceleration signal used to determine CCU_1X_Short_A_MA is smaller than the predetermined number of samples used to determine the value CCU_1X_Long_A_MA. Empirical testing or calculation may be used to determine the number of samples to be used for the value CCU_1YUnsigned_A_MA and for the value CCU_1X_Short_A_MA to provide the desired control of the occupant restraint device(s).

The determination and comparison function 108 of the controller 70 compares the value CCU_1YUnsigned_A_MA against a threshold. The threshold may be variable or may be fixed. Specifically, the determination and comparison function 108 compares the CCU_1YUnsigned_A_MA value as a function of the CCU_1X_Short_A_MA value against a varying threshold 110. A graphical representation of the variation of the threshold 110, in accordance with one example embodiment of the invention, is depicted in FIG. 3. As can be seen, after an initial high plateau followed by a large step or drop, the threshold 110 remains relatively flat, although it includes several small value steps, with increasing CCU_1X_Short_A_MA values. Empirical testing or calculation may be used to determine the variation in the threshold 110 as a function of the CCU_1X_Short_A_MA value to achieve the desired deployment control. The occurrence of the CCU_1YUnsigned_A_MA value exceeding the threshold 110, as determined by determination and comparison function 108, is time latched by a latch function (not shown) of controller 70. This provides a digital HIGH signal to AND function 106 of the controller for a predetermined time period.

When the AND function 106; receives digital HIGH signals from both the OR function 96 and the determination and comparison function 108, via its associated time latch function, the AND function 106 is ON or HIGH and provides a digital HIGH signal to one input of AND function 84 and to determination and comparison function 76. In response to receiving a digital HIGH signal from AND function 106, determination and comparison function 76 switches thresholds used in its comparison function. Specifically, rather than comparing the VEL_REL_1X value as a function of the DISPL_REL_1X value against a first varying discrimination threshold 78 and a second varying discrimination threshold 80, the determination and comparison function 76 compares the VEL_REL_1X value against a single switched discrimination threshold 112. As shown by way of the example embodiment control arrangement in FIG. 3, switched threshold 112 increases slightly with increasing displacement DISPL_REL_1X in the same general manner as the first and second varying thresholds 78 and 80, but remains at lower values than the first and the second varying thresholds 78 and 80. Although a single switched threshold 112 is shown in FIG. 3, if multiple thresholds are desired to control different occupant restraint devices or other safety devices, additional switched thresholds may be employed in the control process of FIGS. 3 and 4.

The occurrence of the VEL_REL_1X value exceeding the switched threshold 112, as determined by determination and comparison function 76, is time latched by a latch function (not shown) of controller 70, which provides a digital HIGH signal to AND function 84 of the controller 70 for a predetermined time period. When AND function 84 receives a digital HIGH signal from AND function 106 and from the determination and comparison function 76, based on a comparison of the VEL_REL_1X value as a function of the DISPL_REL_1X value against the switched threshold 112, the AND function 84 is ON or HIGH and provides a digital HIGH signal to one input of AND function 114 (FIG. 4).

Also in accordance with the example embodiment control process of FIGS. 3 and 4, the side satellite crash acceleration sensor 36 provides an acceleration signal RAS_1BY having a characteristic (e.g., frequency and amplitude) indicative of the vehicle's acceleration in a direction substantially parallel to the Y-axis of the vehicle 12. The acceleration signal RAS_1BY is provided to an LPF function 116 of the controller 70. The LPF function 116 filters the acceleration signal RAS_1BY to eliminate extraneous signal components, such as frequencies resulting from extraneous vehicle operating events and/or from road noise. The signal components removed through filtering are not useful in discriminating whether a vehicle crash event is occurring and whether a vehicle crash event is occurring for which deployment of a driver side actuatable occupant restraint device, such as the first frontal inflatable occupant restraint device 16, is desired. Empirical testing or calculation may be used to determine the signal components useful for discrimination of a vehicle crash condition in a vehicle of interest and/or determining whether a vehicle crash event is occurring for which deployment of a driver side actuatable occupant restraint device is desired. Signal components indicative of a vehicle crash condition and/or useful in determining whether a vehicle crash event is occurring for which deployment of a driver side actuatable occupant restraint device is desired are output for further processing.

Further in accordance with the example embodiment control process of FIGS. 3 and 4, the side satellite crash acceleration sensor 38 provides an acceleration signal RAS_2BY having a characteristic (e.g., frequency and amplitude) indicative of the vehicle's acceleration in a direction substantially parallel to the Y-axis of the vehicle 12. The acceleration signal RAS_2BY is provided to an LPF function 118 of the controller 70. The LPF function 118 filters the acceleration signal RAS_2BY to eliminate extraneous signal components, such as frequencies resulting from extraneous vehicle operating events and/or from road noise. The signal components removed through filtering are not useful in discriminating whether a vehicle crash event is occurring and whether a vehicle crash event is occurring for which deployment of a driver side actuatable occupant restraint device, such as the first frontal inflatable occupant restraint device 16, is desired. Empirical testing or calculation may be used to determine the signal components useful for discrimination of a vehicle crash condition in a vehicle of interest and/or determining whether a vehicle crash event is occurring for which deployment of a driver side actuatable occupant restraint device is desired. Signal components indicative of a vehicle crash condition and/or useful in determining whether a vehicle crash event is occurring for which deployment of a driver side actuatable occupant restraint device is desired are output for further processing.

The filtered output signals from the LPF functions 116 and 118 are provided to A/D converter functions 120 and 122, respectively, of the controller 70. The A/D converter functions 120 and 122 convert the filtered crash acceleration signals into digital signals. The outputs of the A/D converter functions 120 and 122 may be filtered with other filter functions (not shown) having filter values determined for the purpose of eliminating small drifts and offsets associated with the A/D conversion. These other filter functions may be digitally implemented within the controller 70. The filtered crash acceleration signals RAS_1BY and RAS_2BY are provided to two determination functions 124 and 126. Determination function 124 of the controller 70 determines a transverse crash metric value $\|A\|\_MA\_A\_RAS\_1BY$ from the filtered crash acceleration signal RAS_1BY. Determination function 126 of the controller 70 determines a transverse crash metric value $\|A\|\_MA\_A\_RAS\_2BY$ from the filtered crash acceleration signal RAS_2BY.

The values $\|A\|\_MA\_A\_RAS\_1BY$ and $\|A\|\_MA\_A\_RAS\_2BY$ are moving averages of the absolute values of acceleration as sensed by the side satellite crash acceleration sensors 36 and 38, respectively. These values are determined by calculating moving averages of the absolute values of the associated filtered acceleration signals RAS_1BY and RAS_2BY from the side satellite crash acceleration sensors 36 and 38, respectively. As previously explained, a moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average." Empirical testing or calculation may be used to determine the number of samples to be used for each of the values ||A||_MA_A_RAS_1BY and ||A||_MA_A_RAS_2BY.

The values ||A||_MA_A_RAS_1BY and ||A||_MA_A_RAS_2BY are provided to a summing function 128 of the controller 70. The summing function 128 adds the values ||A||_MA_A_RAS_1BY and ||A||_MA_A_RAS_2BY to determine a transverse crash metric value that is a sum of the moving averages of the absolute values of acceleration as sensed by the side satellite crash acceleration sensors 36 and 38. A comparison function of the controller 70 compares the sum of the values ||A||_MA_A_RAS_1BY and ||A||_MA_A_RAS_2BY against a threshold, which may be fixed or may be variable. Specifically, a comparison function 130 compares the sum of the values ||A||_MA_A_RAS_1BY and ||A||MA_A_RAS_2BY against a safing threshold 132. Empirical testing or calculation may be used to determine the value of the safing threshold 132 for a vehicle of interest.

The occurrence of the sum of the values ||A||_MA_A_RAS_1BY and ||A||_MA_A_RAS_2BY exceeding the safing threshold 132, as determined by comparison function 130, is time latched by latch function (not shown) of controller 70, which provides a digital HIGH signal to AND function 114 of the controller for a predetermined time period. When the AND function 114 is ON or HIGH, as a result of receiving digital HIGH signals from both the comparison function 130, via its associated time latch function, and either the AND function 84 or, as previously described, the determination and comparison function 76, the AND function 114 provides a digital HIGH signal to a crash condition determination and deployment control function 134, which determines that a crash condition of the vehicle 12 is occurring. The crash condition determination and deployment control function 134 of the controller 70 also determines whether a vehicle crash event is occurring for which deployment or actuation of an actuatable occupant restraint device, such as the first frontal inflatable occupant restraint device 16 or the driver side seat belt pretensioner 28, or any other vehicle safety device is desired. If deployment is desired, the controller 70 outputs a deployment signal to the actuatable occupant restraint device, such as the first frontal inflatable occupant restraint device 16 and/or the driver side seat belt pretensioner 28, which deploys in response to the deployment signal. The deployment or actuation decision may be based solely on the determination that a vehicle crash condition is occurring or other inputs may be considered in making the deployment or actuation decision.

Figure 5:
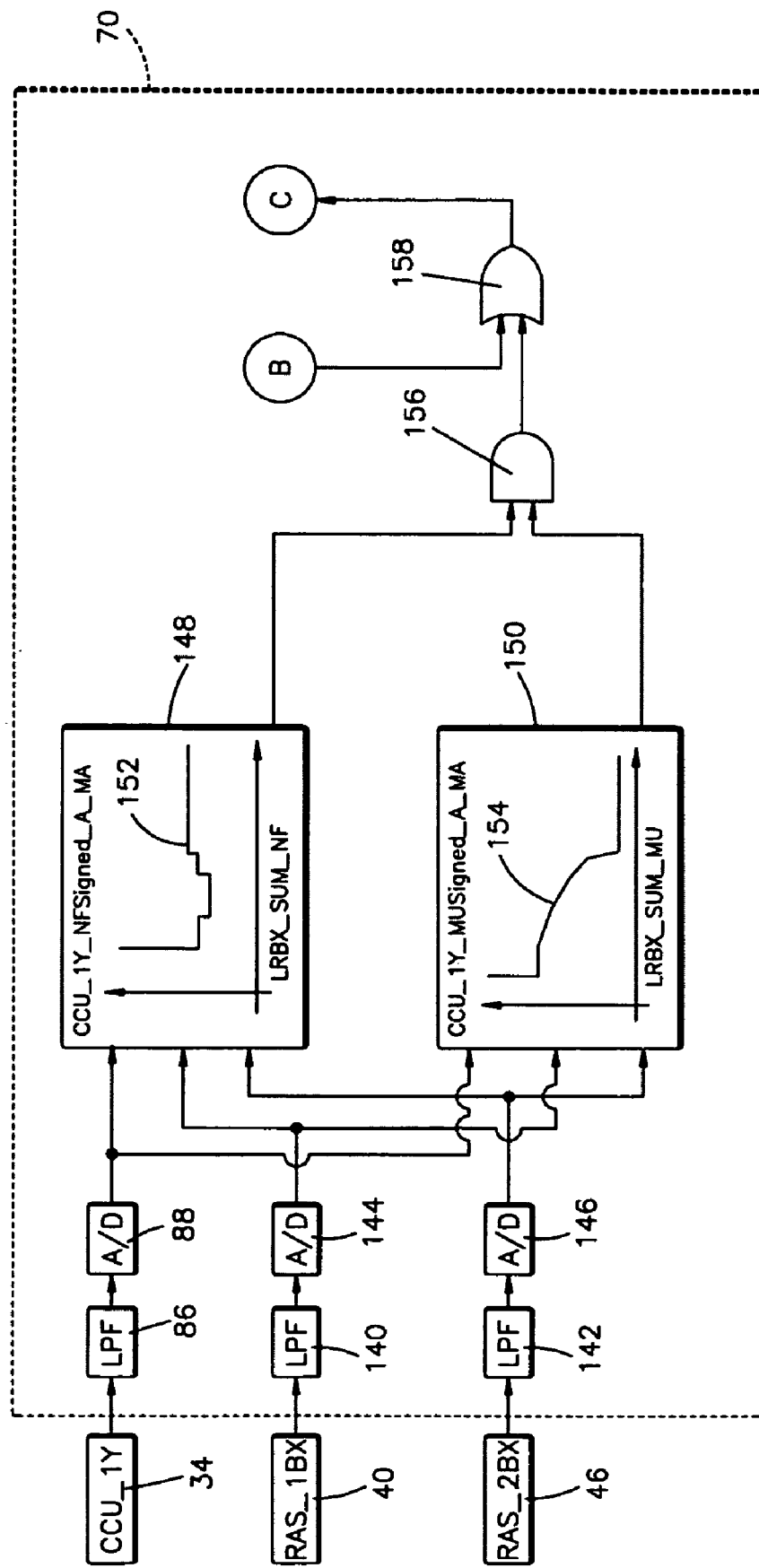
FIG. 5 is a functional block diagram showing part of a control process used by the control portion of FIG. 2 in accordance with a second example embodiment of the present invention.

A second embodiment of the control process and logic used by the controller 70 to control the actuatable occupant restraint system 14 is shown in FIG. 5. The process and logic of FIG. 5 is specifically directed to controlling an actuatable occupant restraint device on the driver side 18 of the vehicle 12, such as the first frontal inflatable occupant restraint device 16. Nonetheless, FIG. 5 is representative of a process and logic that may be used to control the second frontal inflatable occupant restraint device 20 on the passenger side 22 of the vehicle 12 and any other actuatable occupant restraint device that helps to protect a vehicle occupant in response to a crash condition of the vehicle 12. The control process and logic of FIG. 5 may also be used to control any actuatable safety device of the vehicle 12, such as vehicle door locks, a suspension control system, a deployable roll bar and/or an external air bag or other inflatable device external or internal to the vehicle.

In the control process of FIG. 5, the first crash acceleration sensor 32 provides an acceleration signal CCU_1X to the controller 70, and the second crash acceleration sensor 34 provides an acceleration signal CCU_1Y to the controller, just as in the control process of FIGS. 3 and 4. The controller 70 processes the signals CCU_1X and CCU_1Y in the same manner and with the same functions as in the control process of FIGS. 3 and 4 through and including the AND function 106 of the controller. The control process of FIG. 5 differs, however, from the control process of FIGS. 3 and 4 in that acceleration signals RAS_1BX and RAS_2BX from the side satellite crash acceleration sensors 40 and 46, respectively, are used in the control process of FIG. 5, as explained below. Because the control process and logic of FIG. 5 is identical in many respects to the control process and logic of FIGS. 3 and 4, FIG. 5 illustrates only the part of the second embodiment of the control process and logic used by the controller 70 that differs from the control process of FIGS. 3 and 4. The part of the control process shown in FIG. 5 interfaces with the control process shown in FIGS. 3 and 4 at points B and C of FIG. 3, just after AND function 106 and before AND function 84.

In accordance with the example embodiment control process of FIG. 5, the side satellite crash acceleration sensor 40 provides an acceleration signal RAS_1BX having a characteristic (e.g., frequency and amplitude) indicative of the vehicle's acceleration in a direction substantially parallel to the X-axis of the vehicle 12. The acceleration signal RAS_1BX is provided to an LPF function 140 of the controller 70. The LPF function 140 filters the acceleration signal RAS_1BX to eliminate extraneous signal components, such as frequencies resulting from extraneous vehicle operating events and/or from road noise. The signal components removed through filtering are not useful in discriminating whether a vehicle crash event is occurring and whether a vehicle crash event is occurring for which deployment of a driver side actuatable occupant restraint device, such as the first frontal inflatable occupant restraint device 16, is desired. Empirical testing or calculation may be used to determine the signal components useful for discrimination of a vehicle crash condition in a vehicle of interest and/or determining whether a vehicle crash event is occurring for which deployment of a driver side actuatable occupant restraint device is desired. Signal components indicative of a vehicle crash condition and/or useful in determining whether a vehicle crash event is occurring for which deployment of a driver side actuatable occupant restraint device is desired are output for further processing.

Also in accordance with the example embodiment control process of FIG. 5, the side satellite crash acceleration sensor 46 provides an acceleration signal RAS_2BX having a characteristic (e.g., frequency and amplitude) indicative of the vehicle's acceleration in a direction substantially parallel to the X-axis of the vehicle 12. The acceleration signal RAS_2BX is provided to an LPF function 142 of the controller 70. The LPF function 142 filters the acceleration signal RAS_2BX to eliminate extraneous signal components, such as frequencies resulting from extraneous vehicle operating events and/or from road noise. The signal components removed through filtering are not useful in discriminating whether a vehicle crash event is occurring and whether a vehicle crash event is occurring for which deployment of a driver side actuatable occupant restraint device, such as the first frontal inflatable occupant restraint device 16, is desired. Empirical testing or calculation may be used to determine the signal components useful for discrimination of a vehicle crash condition in a vehicle of interest and/or determining whether a vehicle crash event is occurring for which deployment of a driver side actuatable occupant restraint device is desired. Signal components indicative of a vehicle crash condition and/or useful in determining whether a vehicle crash event is occurring for which deployment of a driver side actuatable occupant restraint device is desired are output for further processing.

The filtered output signals from the LPF functions 140 and 142 are provided to A/D converter functions 144 and 146, respectively, of the controller 70. The A/D converter functions 144 and 146 convert the filtered crash acceleration signals into digital signals. The outputs of the A/D converter functions 144 and 146 may be filtered with other filter functions (not shown) having filter values determined for the purpose of eliminating small drifts and offsets associated with the A/D conversion. These other filter functions may be digitally implemented within the controller 70.

The filtered crash acceleration signals RAS_1BX and RAS_2BX, as well as the filtered crash acceleration signal CCU_1Y from the A/D converter function 88, are provided to two determination and discrimination functions 148 and 150. Determination and comparison function 148 of the controller 70 determines a crash metric value CCU_1Y_NFSigned_A_MA from the filtered crash acceleration signal CCU_1Y and determines a crash metric value LRBX_SUM_NF from the filtered crash acceleration signals RAS_1BX and RAS_2BX. Determination and comparison function 150 of the controller 70 determines a crash metric value CCU_1Y_MUSigned_A_MA from the filtered crash acceleration signal CCU_1Y and determines a crash metric value LRBX_SUM_MU from the filtered crash acceleration signals RAS_1BX and RAS_2BX.

The crash metric values CCU_1Y_NFSigned_A_MA and CCU_1Y_MUSigned_A_MA are determined in the same manner as the crash metric value CCU_1YSigned_A_MA, except for the predetermined number of samples of the filtered acceleration signal CCU_1Y used. Specifically, the predetermined numbers of samples used to determine the value CCU_1Y_NFSigned_A_MA and the value CCU_1Y_MUSigned_A_MA may be different from the number used to determine the value CCU_1YSigned_A_MA. In addition, the predetermined number of samples of the filtered acceleration signal CCU_1Y used to determine the value CCU_1Y_NFSigned_A_MA may be different from the number used to determine the value CCU_1Y_MUSigned_A_MA. Empirical testing or calculation may be used to determine the number of samples to be used for the value CCU_1Y_NFSigned_A_MA and for the value CCU_1Y_MUSigned_A_MA.

The values LRBX_SUM_NF and LRBX_SUM_MU are the sums of moving averages of acceleration as sensed by the side satellite crash acceleration sensors 40 and 46. These values are determined by calculating moving average values of the associated filtered acceleration signals RAS_1BX and RAS_2BX from the side satellite crash acceleration sensors 40 and 46 and adding together the determined moving average values. As previously explained, a moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average." Empirical testing or calculation may be used to determine the number of samples to be used for the values LRBX_SUM_NF and LRBX_SUM_MU. The predetermined number of samples of the filtered acceleration filtered acceleration signals RAS_1BX and RAS_2BX used to determine the value LRBX_SUM_NF may be different from the number used to determine the value LRBX_SUM_MU.

The determination and comparison function 148 of the controller 70 compares the value CCU_1Y_NFSigned_A_MA against a threshold. The threshold may be variable or may be fixed. Specifically, the determination and comparison function 148 compares the CCU_1Y_NFSigned_A_MA value as a function of the LRBX_SUM_NF value against a varying threshold 152. A graphical representation of the variation of the threshold 152, in accordance with one example embodiment of the present invention, is depicted in FIG. 5. As can be seen, after an initial high plateau followed by a large step or drop, the threshold 152 remains relatively flat, although it includes several small value steps, with increasing LRBX_SUM_NF values. Empirical testing or calculation may be used to determine the variation in the threshold 152 as a function of the LRBX_SUM_NF value to provide the desired control of the restraint device(s). The occurrence of the CCU_1Y_NFSigned_A_MA value exceeding the threshold 152, as determined by determination and comparison function 148, is time latched by a latch function (not shown) of controller 70. This provides a digital HIGH signal to AND function 156 of the controller for a predetermined time period.

The determination and comparison function 150 of the controller 70 compares the value CCU_1Y_MUSigned_A_MA against a threshold. The threshold may be variable or may be fixed. Specifically, the determination and comparison function 150 compares the CCU_1Y_MUSigned_A_MA value as a function of the LRBX_SUM_MU value against a threshold 154. A graphical representation of the variation of the threshold 154, in accordance with one example embodiment of the present invention, is depicted in FIG. 5. As can be seen, after an initial high plateau followed by a large step or drop, the threshold 154 generally decreases with increasing LRBX_SUM_MU values and ultimately becomes constant. Empirical testing or calculation may be used to determine the variation in the threshold 154 as a function of the LRBX_SUM_MU value to provide the desired control of the restraint device(s). The occurrence of the CCU_1Y_MUSigned_A_MA value exceeding the threshold 154, as determined by determination and comparison function 150, is time latched by a latch function (not shown) of controller 70. This provides a digital HIGH signal to AND function 156 of the controller for a predetermined time period.

When the AND function 156 receives digital HIGH signals from both the determination and comparison function 148 and the determination and comparison function 150, via their associated time latch functions, the AND function 156 is ON or HIGH and provides a digital HIGH signal to OR function 158. When OR function 158 receives a digital HIGH from either the AND function 106 (FIG. 3) or the AND function 156, the OR function is ON or HIGH and provides a digital HIGH signal to AND function 84 (FIG. 3) and to determination and comparison function 76. In response to receiving a digital HIGH signal from OR function 158, determination and comparison function 76 switches thresholds. Specifically, rather than comparing the VEL_REL_1X value as a function of the DISPL_REL_1X value against a first varying discrimination threshold 78 and a second varying discrimination threshold 80, the determination and comparison function 76 compares the VEL_REL_1X value against a single switched discrimination threshold 112. As shown by way of the example embodiment control arrangement in FIG. 3, switched threshold 112 increases slightly with increasing displacement DISPL_REL_1X in the same general manner as the first and second varying thresholds 78 and 80, but remains at lower values than the first and second varying thresholds 78 and 80. Although a single switched threshold 112 is shown in FIG. 3, if multiple thresholds are desired to control different occupant restraint devices or other safety devices, additional thresholds may be employed in the control process of FIG. 5.

The occurrence of the VEL_REL_1X value exceeding the switched threshold 112, as determined by determination and comparison function 76, is time latched by a latch function (not shown) of controller 70, which provides a digital HIGH signal to the AND function 84 of the controller 70 for a predetermined time period. When AND function 84 receives a digital HIGH signal from OR function 158 and from the determination and comparison function 76, based on a comparison of the VEL_REL_1X value as a function of the DISPL_REL_1X value against the switched threshold 112, the AND function 84 is ON or HIGH and provides a digital HIGH signal to AND function 114 (FIG. 4). From this point on, the control process of FIG. 5 continues in the same manner and with the same functions as in the control process of FIGS. 3 and 4 through and including the crash condition determination and deployment control function 134, which determines that a crash condition of the vehicle 12 is occurring.

The crash condition determination and deployment control function 134 of the controller 70 also determines whether a vehicle crash event is occurring for which deployment or actuation of an actuatable occupant restraint device, such as the first frontal inflatable occupant restraint device 16 or the driver side seat belt pretensioner 28, or any other vehicle safety device is desired. If deployment is desired, the controller 70 outputs a deployment signal to the actuatable occupant restraint device, such as the first frontal inflatable occupant restraint device 16 and/or the driver side seat belt pretensioner 28, which deploy in response to the deployment signal. The deployment or actuation decision may be based solely on the determination that a vehicle crash condition is occurring or other inputs may be considered in making the deployment or actuation decision.

From the above description of the invention, those skilled in the art will perceive improvements, changes and modifications. Such improvements, changes, and/or modifications within the skill of the art are intended to be covered by the appended claims.

Having described the invention, the following is claimed:

1. A method for determining a crash condition of a vehicle comprising the steps of:
   sensing crash acceleration in a first direction substantially parallel to a front-to-rear axis of the vehicle and providing a first acceleration signal indicative thereof;
   sensing crash acceleration in a second direction substantially parallel to a side-to-side axis of the vehicle and near opposite sides of the vehicle and providing second acceleration signals indicative thereof;
   determining a transverse crash value functionally related to the second acceleration signals;
   comparing the determined transverse crash value against a safing threshold; and
   determining a crash condition of the vehicle in response to (a) the comparison and (b) the first acceleration signal wherein said step of determining a transverse crash value functionally related to the second acceleration signals includes the step of determining a sum of moving averages of absolute values of acceleration in the second direction based on the second acceleration signals.

2. The method of claim 1 further comprising the step of providing an actuation signal for actuating an actuatable safety device of the vehicle in response to determining a crash condition of the vehicle.

3. The method of claim 1 wherein said step of determining a transverse crash value functionally related to the second acceleration signals includes the steps of:
   determining moving averages of absolute values of acceleration in the second direction based on the second acceleration signals, and
   determining the transverse crash value based on the determined moving averages of absolute values of acceleration in the second direction.

4. The method of claim 3 wherein said step of determining the transverse crash value based on the determined moving averages of absolute values of acceleration in the second direction includes the step of determining the transverse crash value based on the determined sum of the moving averages of absolute values of acceleration in the second direction.

5. The method of claim 1 further comprising the steps of:
   determining crash velocity in said first direction from the first acceleration signal;
   determining crash displacement in said first direction from the first acceleration signal; and
   comparing the determined crash velocity as a function of the determined crash displacement against one of a discrimination threshold and a switched discrimination threshold; and
   wherein said step of determining a crash condition of the vehicle comprises determining a crash condition of the vehicle in response to both the determined crash velocity as a function of crash displacement exceeding one of the discrimination threshold and the switched discrimination threshold and the transverse crash value exceeding the safing threshold.

6. An apparatus for determining a crash condition of a vehicle, said apparatus comprising:
   a first accelerometer for sensing crash acceleration in a first direction substantially parallel to a front-to-rear axis of the vehicle and providing a first acceleration signal indicative thereof;
   second accelerometers for sensing crash acceleration in a second direction substantially parallel to a side-to-side axis of the vehicle and near opposite sides of the vehicle and providing second acceleration signals indicative thereof; and
   a controller determining a transverse crash value functionally related to the second acceleration signals and comparing the transverse crash value against a safing threshold, the controller also determining a crash condition of the vehicle in response to (a) the comparison and (b) the first acceleration signal wherein the controller determines the transverse crash value as a sum of moving averages of absolute values of acceleration in the second direction based on the second acceleration signals.

7. The apparatus of claim 6 wherein the controller also provides an actuation signal for actuating an actuatable safety device of the vehicle in response to determining a crash condition of the vehicle.

8. The apparatus of claim 6 wherein the controller determines the transverse crash value from moving averages of absolute values of acceleration in the second direction based on the second acceleration signals.

9. The apparatus of claim 6 wherein the controller further determines a crash velocity and a crash displacement from the first acceleration signal and compares the determined crash velocity as a function of the determined crash displacement against one of a discrimination threshold and a switched discrimination threshold, the controller determining a crash condition of the vehicle in response to both (a) the determined crash velocity as a function of the determined crash displacement exceeding one of the discrimination threshold and the switched discrimination threshold and (b) the transverse crash value exceeding the safing threshold.

10. The apparatus of claim 9 wherein at least one of the discrimination and transverse thresholds is a variable threshold.

11. The apparatus of claim 9 wherein at least one of the discrimination and transverse thresholds is a fixed threshold.

12. The apparatus of claim 6 wherein the first accelerometer is located at a substantially central vehicle location.

* * * * *